United States Patent [19]
Nelson

[11] 3,785,516
[45] Jan. 15, 1974

[54] GLASS JAR HANDLING SYSTEM
[75] Inventor: Lloyd A. Nelson, Fremont, Mich.
[73] Assignee: Gerber Products Company, Fremont, Mich.
[22] Filed: Nov. 13, 1972
[21] Appl. No.: 306,269

Related U.S. Application Data
[62] Division of Ser. No. 173,887, Aug. 23, 1971, Pat. No. 3,724,686.

[52] U.S. Cl. .............................................. 214/152
[51] Int. Cl. ........................................... B65g 59/02
[58] Field of Search ............... 214/8.5 A, 8.5 F, 214/152

[56] References Cited
UNITED STATES PATENTS
3,107,794  10/1963  Bechtold .................. 214/8.5 A
3,180,499  4/1965   Wildheim ................. 214/8.5 A Primary Examiner—Robert G. Sheridan
Assistant Examiner—George F. Abraham
Attorney—Thomas F. Smegal, Jr.

[57] ABSTRACT

A system for use in depalletizing glass jars disposed in groups in a vertical stack wherein the groups of jars are successively moved laterally off the top of the stack and onto a lateral conveyor. The jars are supported on flat panels and a sensor is provided to sense the uppermost panel and to control the elevation of the stack, whereby the elevation will stop when the upper group of jars is aligned with the conveyor. Means is provided to push the jars away from alignment with the sensor so that it will engage the uppermost jar-supporting panel rather than the jars themselves. Means is also provided to push the upper panel laterally to assure that it will be in position to engage the sensor.

3 Claims, 10 Drawing Figures

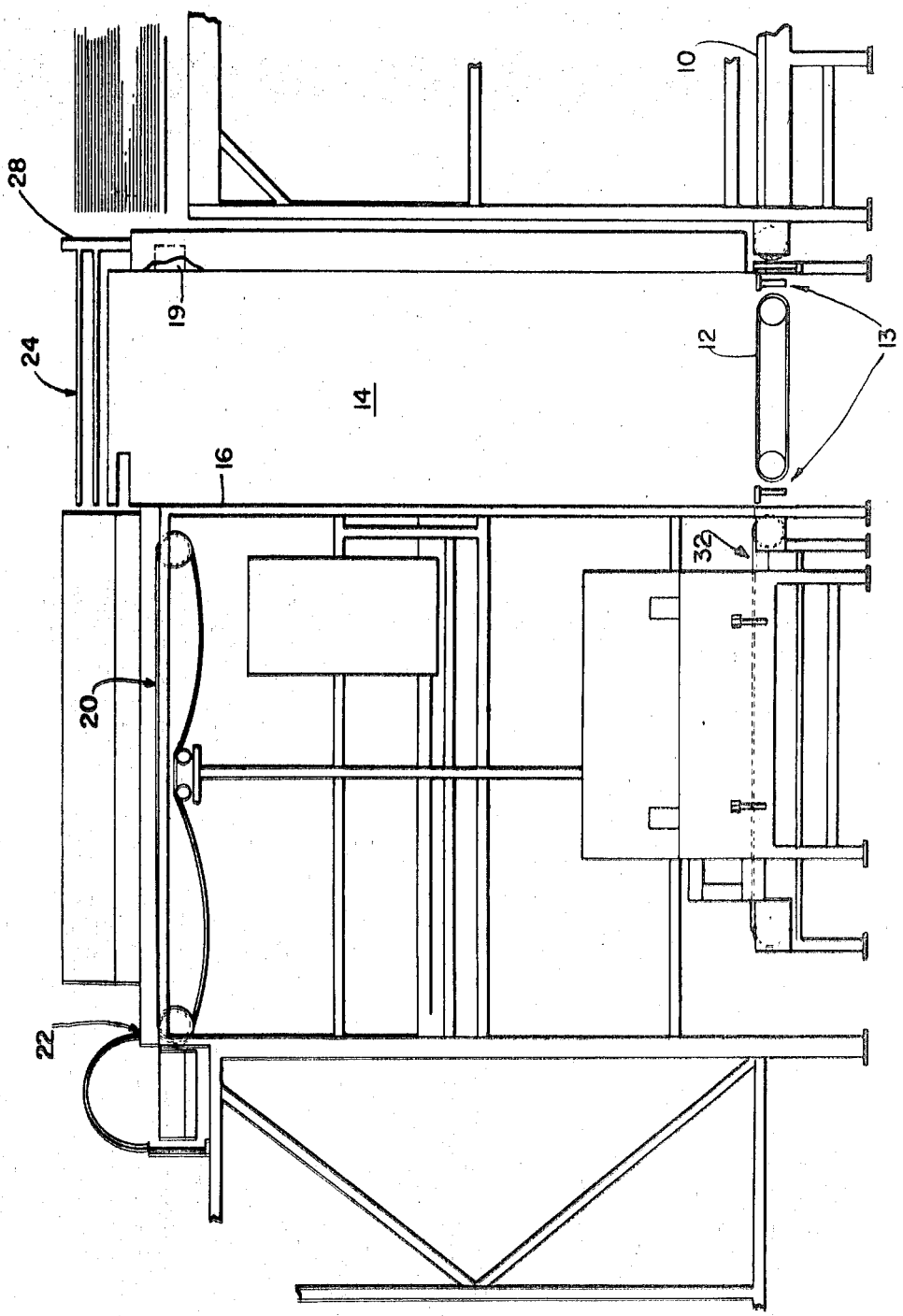

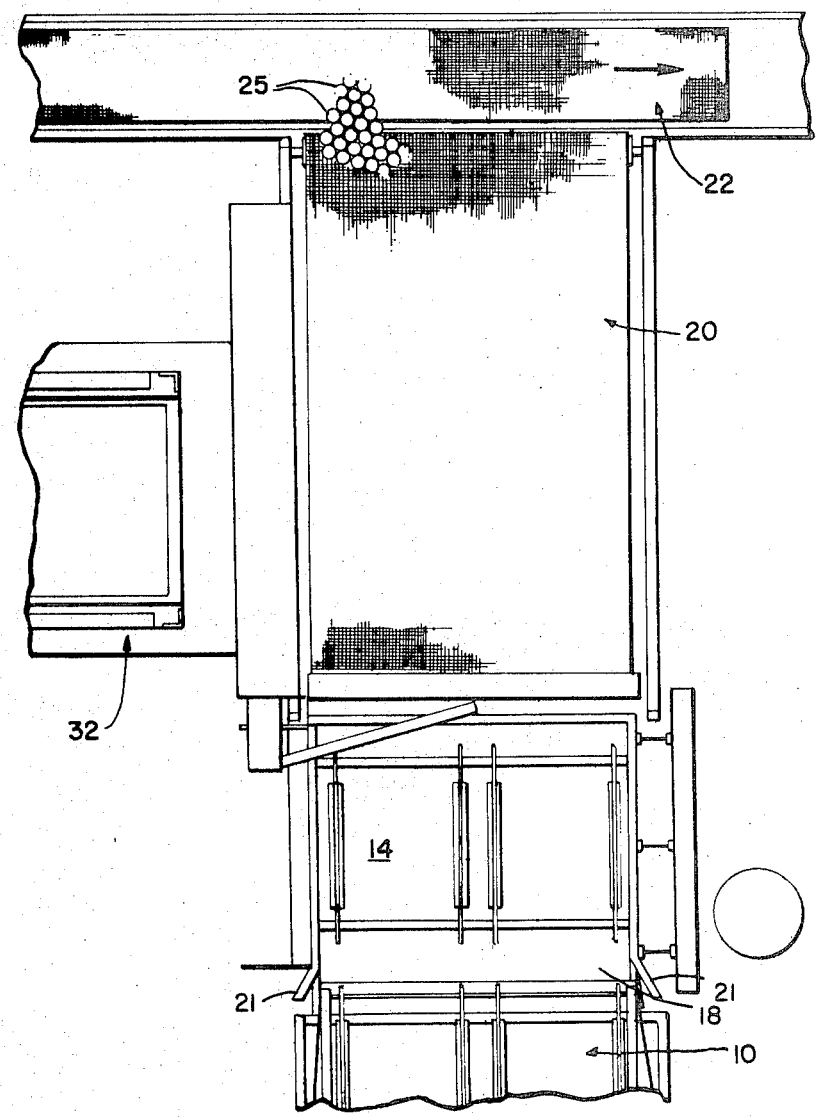
FIG_2

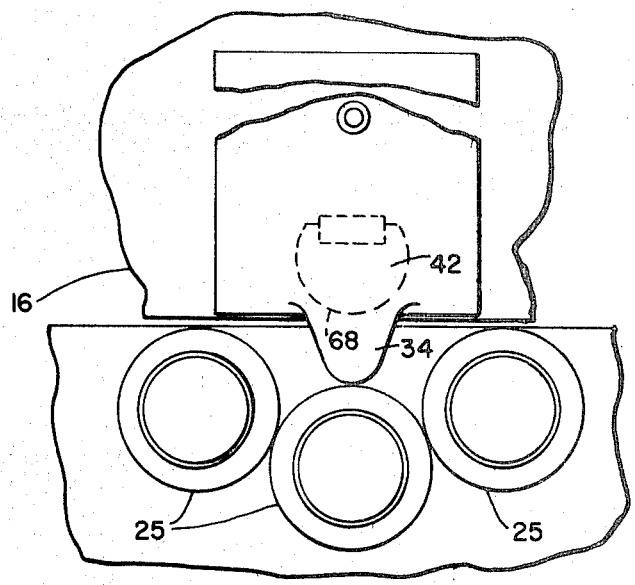
FIG_3
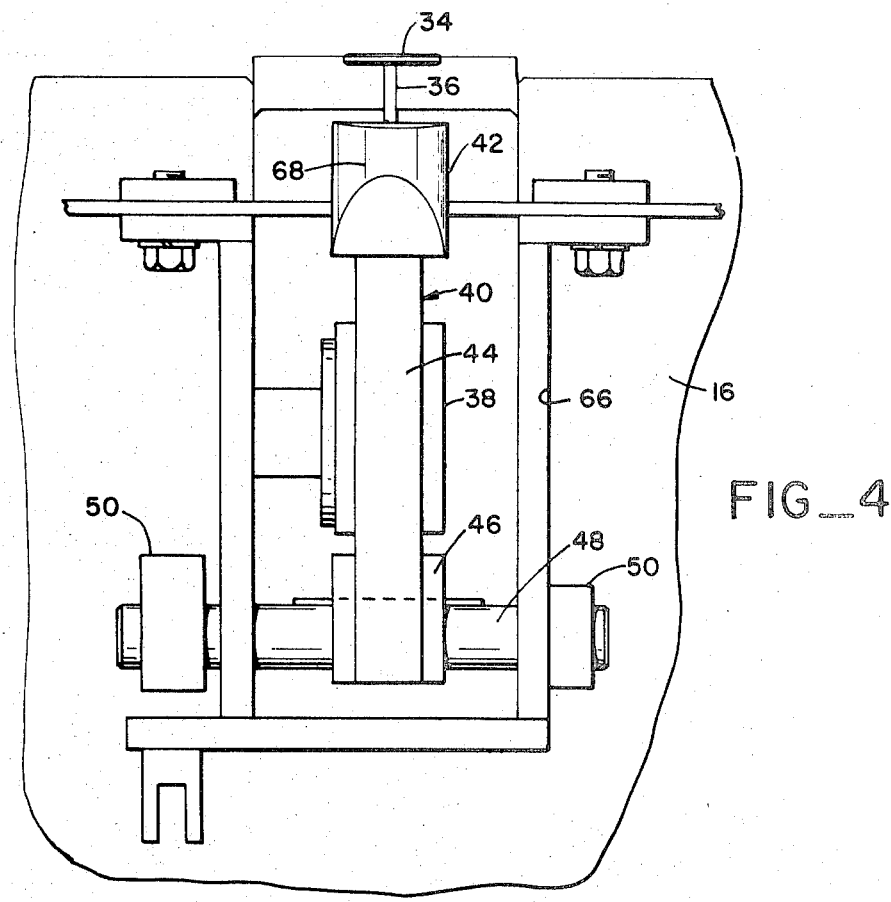
FIG_4

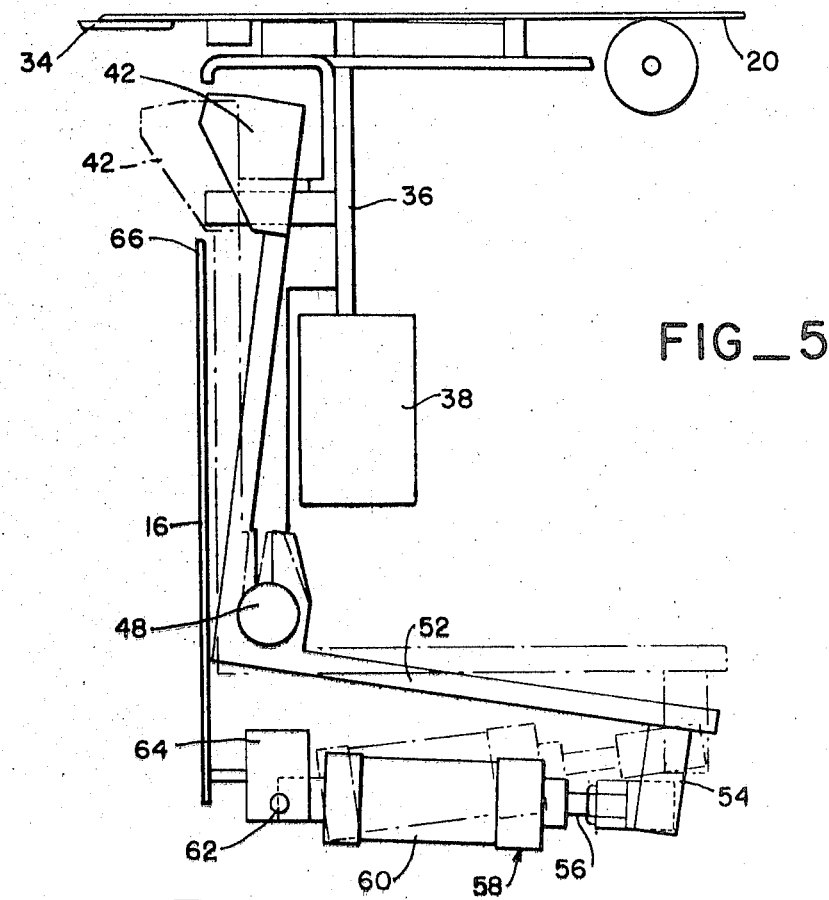
FIG_5
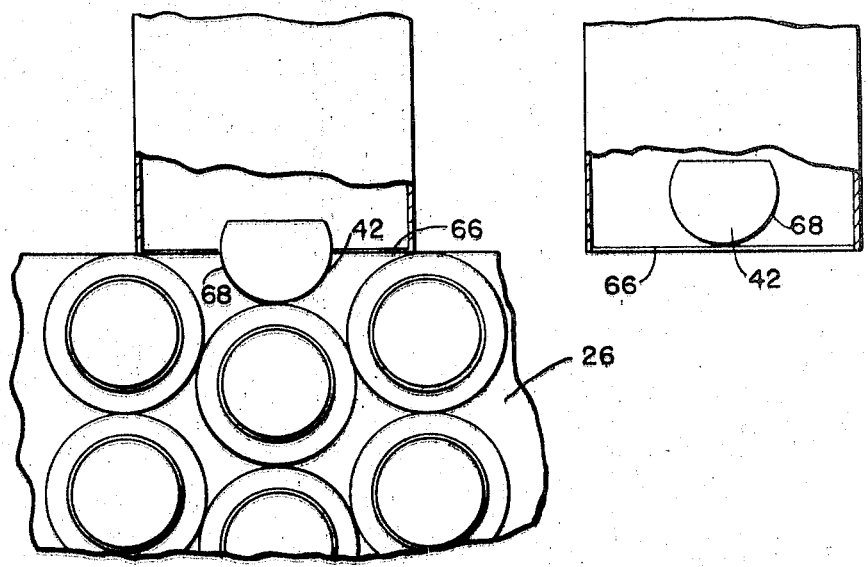
FIG_7      FIG_6

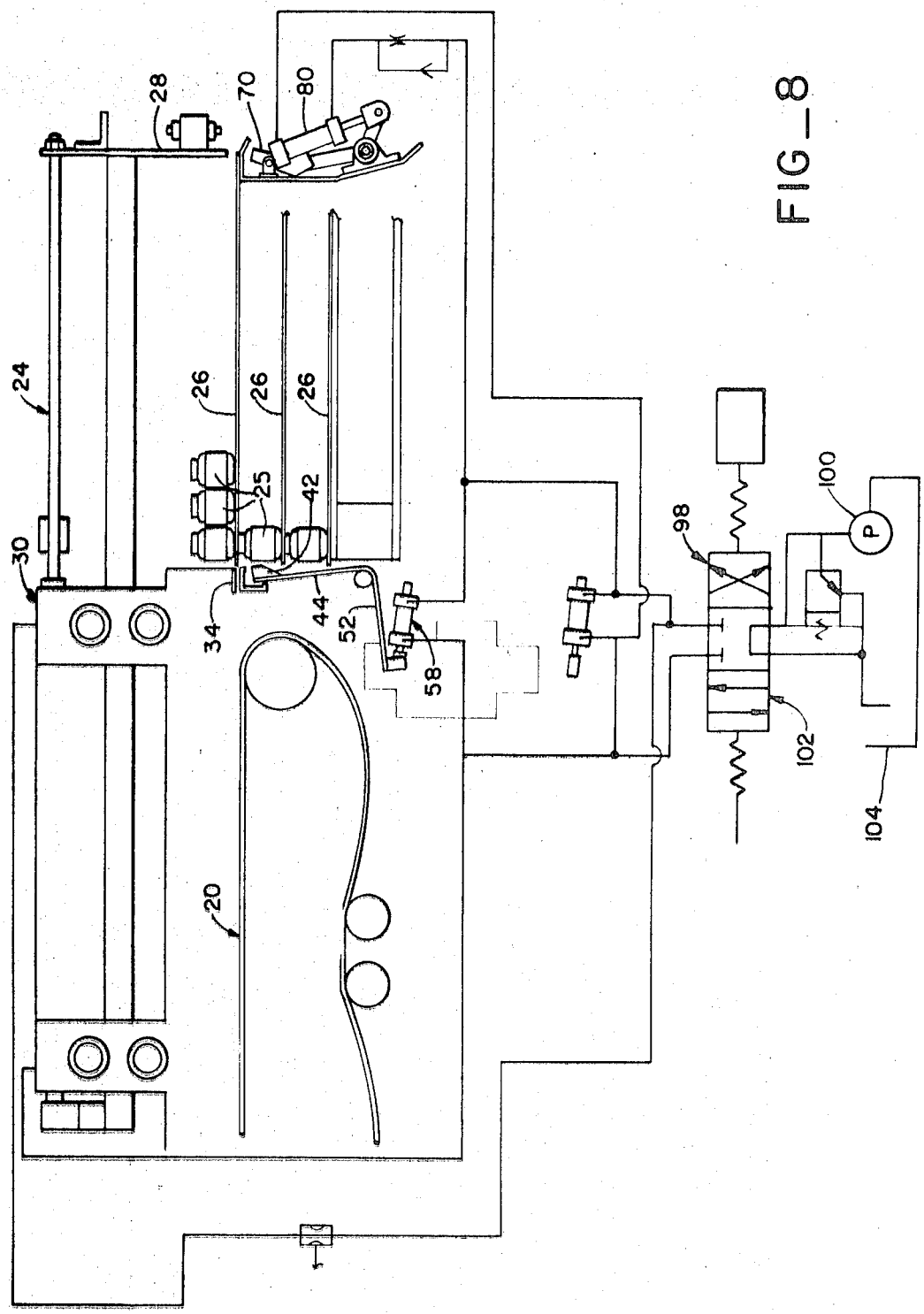
FIG_8

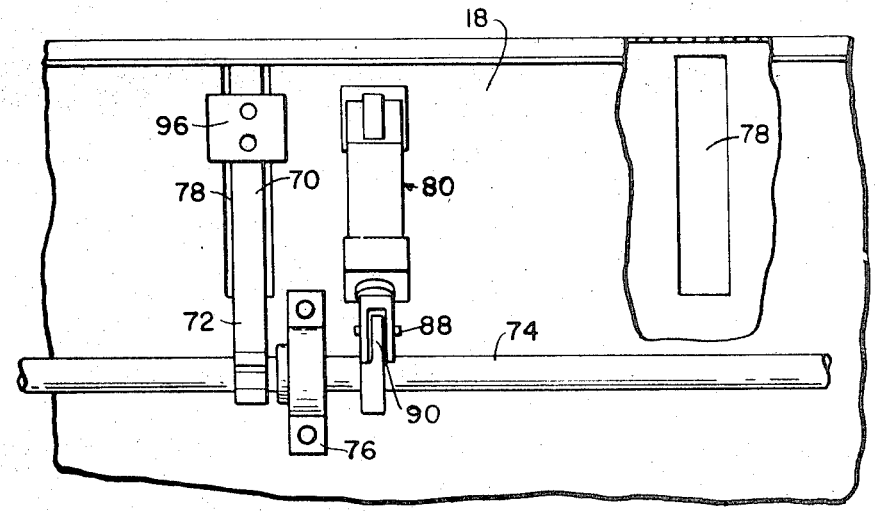
FIG_10
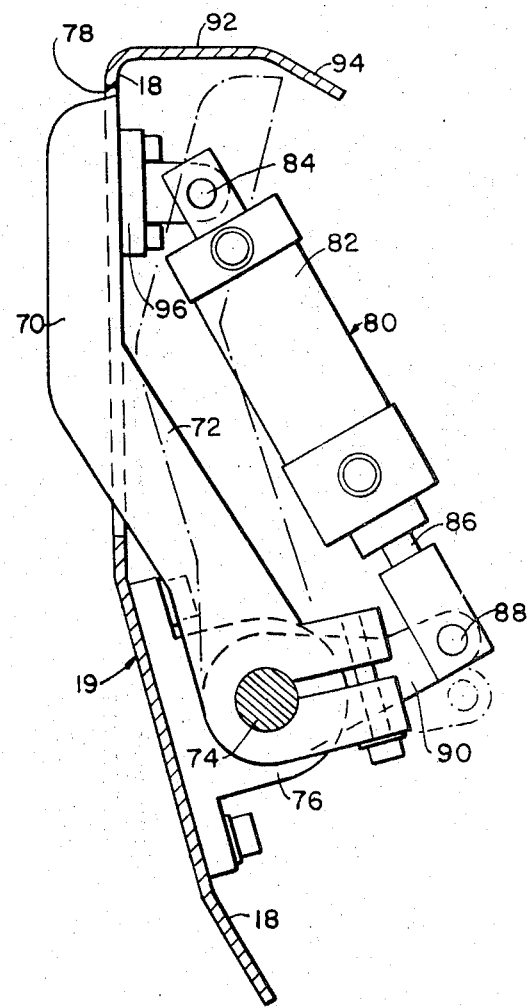
FIG_9

GLASS JAR HANDLING SYSTEM

This application is a division of application Ser. No. 173,887, filed Aug. 23, 1971, which has matured into U.S. Pat. No. 3,724,686.

This invention relates to improvements in the handling of glass jars in volume and, more particularly, to a system for separating stacked groups of glass jars from a pallet.

Prepared baby foods are oftentimes packaged in relatively small glass jars of various volumes, representative volumes being denoted by 3½ oz., 5 oz., 6¼ oz., and 8 oz. In a jar-filling operation, many such glass jars must be readied for use. A preferred way of handling the jars and transporting them to a filling plant is to place groups of jars on a number of panel dividers and to stack the jar-laden dividers on a conventional pallet. For instance, for a 5 oz. jar, there would be 483 jars on each panel divider and 26 layers or groups of jars can be disposed on a pallet. Therefore, each pallet would support 12,558 jars and 16 such pallets can be placed in a van for moving the jars to the filling plant. Thus, the van can carry a total of 200,928 jars. It can be seen, therefore, that many jars are actually transported to a filling plant.

Conventional systems for handling pallets of such jars have been made to cause the groups of jars to be moved successively and incrementally upwardly so that the top group of jars in a stack can be moved laterally onto a conveyor. Thus, each group of jars can be moved onto a discharge conveyor as its panel divider is aligned with the conveyor.

To stop the uppermost panel divider in alignment with the conveyor, conventional equipment has a sensor which projects into the path of the panel divider and engages its upper surface. The sensor serves to actuate a switch which controls the elevator drive for the pallet. The problem which arises, however, with the use of this sensor is that it oftentimes engages the jars on the uppermost panel divider rather than the divider itself. Thus, the panel divider stops below the conveyor rather than in alignment with it.

The present invention provides an improvement for such depalletizing equipment by providing means for assuring that none of the jars on the uppermost divider panel engage the sensor as the pallet is incrementally elevated. This is accomplished by moving certain jars out of alignment with the sensor, leaving the adjacent upper surface portion of the uppermost panel divider free to be engaged by the sensor. Thus, the sensor will sense the panel divider to effect the stopping of the elevation of the pallet so that the uppermost jars can be swept laterally off the divider and onto the discharge conveyor. Then, an operator can lift off the uppermost panel divider, following which the next incremental elevation of the pallet can occur.

Another aspect of the invention is to provide one or more pusher arms for pushing a panel divider near the top of the stack laterally through a sufficient distance to assure that the panel divider will be in position to be engaged by the sensing finger. This is necessary because the panel dividers on a pallet may not be truly vertically aligned with each other and must be properly oriented to engage the sensor. Otherwise, the elevation may not stop when the uppermost panel divider is aligned with the discharge conveyor.

The primary object of this invention is to provide an improved jar handling system of the type having depalletizing capabilities including a sensor for engaging the uppermost panel divider supporting one of a group of vertically stacked jars on a vertically movable pallet. Means is provided to move the jars on the uppermost panel divider to clear the upper surface portion thereof which is aligned with the sensor so that the latter will engage the uppermost panel divider rather than the jars themselves to effect the stopping of the elevation of the panel at a location permitting the uppermost jars to be moved onto a lateral conveyor aligned with the uppermost divider.

A further object of this invention is to provide a system of the type described wherein each panel divider is pushed laterally and against an abutment before it becomes aligned with the discharge conveyor so that the panel divider will be aligned with the sensor to engage the same as the pallet is incrementally elevated.

Other objects of this invention will become apparent as the following specification progresses, reference being had to the accompanying drawings for an illustration of the invention.

IN THE DRAWINGS:

FIG. 1 is a side elevational view of a jar handling system including an elevator for a pallet containing stacked layers of jars, a lateral discharge conveyor near the upper end of the elevator and a pusher arm for sweeping the uppermost layer of glass jars in the stack onto the takeoff conveyor;

FIG. 2 is a top plan view of the system of FIG. 1;

FIG. 3 is an enlarged, fragmentary top plan view of a sensing finger to sense the panel divider supporting the uppermost layer of glass jars;

FIG. 4 is a fragmentary front elevational view of the jar shifting mechanism below the sensing finger of FIG. 3;

FIG. 5 is a side elevational view of the mechanism of FIG. 4, showing the operative and retracted positions thereof;

FIG. 6 is a view similar to FIG. 3 but showing the retracted position of the mechanism of FIGS. 4 and 5;

FIG. 7 is a view similar to FIG. 6 but showing the jar shifting position of the mechanism;

FIG. 8 is a schematic view of the portion of the system near the upper end of the elevator, showing the jar shifting mechanism and a device for shifting a panel divider toward the shifting mechanism;

FIG. 9 is an enlarged, fragmentary side elevational view of the pusher mechanism; and FIG. 10 is a rear elevational view of the pusher mechanism.

The glass jar handling system with which the improvements of the present invention are utilized is of the type shown in FIG. 1 and includes a first infeed conveyor 10, a second, relatively short conveyor 12 aligned with infeed conveyor 10 and disposed at the bottom of an elevator bin 14 having a front wall 16 and a rear opening 18 extending upwardly from below the planes of conveyors 10 and 12 to a backstop 19 hereinafter described. A pair of outwardly flared side strips 21 (FIGS. 1 and 2) embrace opening 18 and serve to funnel an incoming stack of jars on a pallet advanced toward conveyor 12 by conveyor 1a.

A discharge conveyor 20 is adjacent to and projects laterally from the upper end of elevator bin 14, and a second discharge take-away conveyor 22 is horizontally aligned with conveyor 20 but extends at right angles thereto. An elevating mechanism 13 shown only partially in FIG. 1, operates in bin 14 to move incrementally upwardly so that a pallet containing vertically stacked groups of jars on mechanism can be moved upwardly, in stepwise fashion, mechanism 13 stopping each time the uppermost group of jars can be swept laterally onto conveyor 20 by sweep arm means 24. When all of the jars have been removed in this manner from the pallet, mechanism 13 is lowered and thus returns it to its initial position shown in FIG. 1 in horizontal alignment with infeed conveyor 10.

The system thus described is adapted to be utilized to depalletize glass jars 25 (FIG. 2) disposed in stacked layers on a conventional pallet, each layer of glass jars being disposed and supported on a panel divider 26 (FIG. 3, 7 and 8) with each divider being supported by the layer of glass jars therebelow and the lowermost divider supported on the pallet itself. The pallet with the stack of glass jars thereon can be loaded on infeed conveyor 10 in any suitable manner, conveyor 10 being operated to advance the loaded pallet toward and onto elevator bin conveyor 12, whereupon the pallet is incrementally elevated to successively position the uppermost layers of glass jars in position to be swept laterally and onto discharge conveyor 20 as the divider panel for the uppermost jars remains in the bin. The divider panel at the uppermost level can then be manually lifted off the stack by an operator, following which the elevating conveyor can move again through the incremental distance necessary to advance the various layers of jars successively into horizontal alignment with conveyor 20.

The elevation of mechanism 13 is operator controlled and the operator can observe when the upper layer of glass jars has been swept onto conveyor 20. He can then actuate the power means of mechanism 13 for elevating the latter once again. Sweep arm means 24 has a laterally shiftable sweep arm plate 28 coupled in any suitable manner to fluid-actuated power structure 30 (FIG. 8) which reciprocates the plate from right to left and then the plate is returned to the right when viewing FIG. 8.

When the empty pallet is lowered, it is brought into horizontal alignment with an empty pallet discharge conveyor 32 (FIG. 1) and the latter conveyor advances the same to a side transfer mechanism (not shown) then into an empty pallet stacker for stacking in an orderly fashion. As an empty pallet moves to the left when viewing FIG. 1 onto conveyor 32, a loaded pallet with glass jars thereon can be moved from infeed conveyor 10 onto elevator bin conveyor 12 to prepare for the next depalletizing operation.

The system thus far described utilizes one or more sensors 34 near the upper end of elevator bin 14. The purpose of each sensor is to sense the upper surface of the uppermost divider 26 and, since the sensor is in horizontal alignment with the upper stretch of discharge conveyor 20, it follows that the uppermost divider panel, when it is sensed by the sensor, will also be in horizontal alignment with the upper stretch of discharge conveyor 20. Sensor 34 is coupled mechanically by a shaft 36 to a limit switch 38 (FIG. 4 and 5), the limit switch being operable to control a hydraulic circuit which gages travel of mechanism 13. The sensor is slightly movable upwardly so that the limit switch is actuated to de-energize mechanism 13 and to stop its elevation when the uppermost divider panel is in horizontal alignment with the upper stretch of conveyor 20. Then, the operator actuates power structure 30 causing sweep arm plate 28 to sweep the jars on the uppermost divider 26 laterally and onto a discharge conveyor 20.

It has been found that the jars on the uppermost divider panel may sometimes engage sensor 34 during the elevation of the uppermost layer, and when this occurs, the sensor is shifted upwardly to cause premature deactuation of the hoist. This will occur, of course, before the divider is horizontally aligned with the upper stretch of conveyor 20. To avoid this problem, one of the improvements of the present invention provides a jar shifting mechanism 40 (FIGS. 4-7) which includes a jar shifting member 42 mounted on the upper end of an arm 44 whose lower end is pivotally mounted by bearing 46 on a generally horizontal shaft 48 rigidly secured by mounts 50 in any suitable manner to the adjacent front wall 16 defining a part of elevator bin 14. Arm 44 has a lateral extension 52 (FIG. 5) secured to its lower end, extension 52 projecting away from shaft 48. The outer end of extension 52 has a clevis 54 which is coupled to the outer end of a piston rod 56 of a fluid piston and cylinder assembly 58. The opposite end of the cylinder 60 of assembly 58 is pivotally secured by a pin 62 on structure 64 also rigid to front wall 16. Actuation of assembly 58 causes the piston rod 56 to move outwardly of cylinder 60 and this causes the cylinder to pivot about pin 62 from the full line position of FIG. 5 to the dashed line position thereof. This causes extension 52 and thereby arm 44 to pivot about shaft 50, causing member 42 to move from the right hand side (FIG. 5) of wall 16 through an opening 66 therein to the lefthand side as shown in dashed lines in FIG. 5.

As member 42 moves in the foregoing manner, it moves any jars in its path away from the adjacent edge of the corresponding divider 26, thus leaving a portion of the upper surface of the divider clear of any jars. As shown in FIG. 3, member 42 is directly below sensor 34 so that the cleared portion of the upper surface of the uppermost divider 26 will engage the sensor as the divider is elevated by mechanism 13.

Member 42 has a convex outer surface 68 as shown in FIGS. 3, 4, 6 and 7 to facilitate movement of the adjacent jars. Also, the vertical length of member 42 is short enough to prevent it from engaging the divider as it shoves the jars inwardly of the adjacent edge of the divider. This assures that member 42 will not be stopped prematurely before the jars have been move through the proper distance.

Means is provided adjacent to elevator bin 14 to shove one or more of the upper dividers 26 to the left when viewing FIGS. 1 and 8 or toward and into engagement with front wall 16. The purpose of this feature is to assure that the uppermost divider is sufficiently close to front wall 16 such that an upper surface portion of the uppermost divider will be vertically aligned with sensor 34. Oftentimes the various dividers in the stack on the pallet are not in true vertical alignment with each other. Also, some dividers may be too far from wall 16 to permit them to engage the sensor.

To avoid this problem, a number of pusher bars 70 are mounted for pivotal movement on backstop 19 near the upper end of elevator bin 14 as shown in FIGS. 8-10. Each bar 70 has an offset extension 72 (FIGS. 9 and 10) which is rigidly secured to a shaft 74 mounted by a number of bearings 76 on the rear face of backstop 19. One of the bearings 76 is shown in FIGS. 9 and 10. Backstop 19 has openings 78 therein for pusher bars 70, respectively, to permit the bar to extend into bin 14. The width of each bar is such as to cause it to extend a distance into bin 14 sufficient to engage and push an adjacent divider 26 toward and against front wall 16. Thus, this wall acts as an abutment to limit the horizontal movement of the divider.

The pusher bars 70 are moved simultaneously by the rotation of shaft 74 through a small arc under the influence of a double acting fluid-actuated power assembly 80. To this end, assembly 80 has a cylinder 82, one end of which is pivotally coupled by a pin 84 to the rear face of backstop 19. A piston within the cylinder has a rod 86 which projects outwardly from the cylinder and is pivotally coupled by a pin 88 to one end of an arm 90 whose opposite end is rigidly secured to shaft 74. Thus, when rod 86 is forced into cylinder 82, the effective length of assembly 80 decreases, thereby causing shaft 74 to rotate in a counterclockwise sense. This causes pusher bars 70 to move simultaneously through respective opening 78 and against the adjacent edge of a divider 26 to urge the latter toward and into engagement with front wall 16. When rod 86 moves outwardly of cylinder 82, shaft 74 is rotated in a clockwise direction to cause the pusher bars to retract. To limit the rearward movement of the pusher bars when the same are retracted, backstop 19 has a rear overhang 92 (FIG. 10) provided with an inclined rear extension 94 in the path of the upper end of each pusher bar 80. Also, to limit the forward travel of the pusher bars, each bar 70 has a rear plate 96 thereon for engaging the rear face of backstop 19 when the bar has moved through the desired maximum distance into bin 14. Thus, plates 96 serve as stops. Generally, pusher bars 70 will be operable to engage and push the divider second from the top. However, more than one divider can be pushed, if desired.

FIG. 8 illustrates in a schematic form the fluid source 98 for supplying fluid under pressure to power devices 30, 58 and 80. Source 98 is controlled by the operator of the system which includes a pump 100 and a valve 102 for controlling fluid under pressure emanating from a fluid tank 104. Source 98 is controlled in a manner such that fluid is supplied to power devices 58 and 80 simultaneously to cause inward movements of member 42 and pusher bars 70. Also, member 42 and the pusher bars are retracted at the same time.

OPERATION

The system is placed in operation when a full pallet is placed on in-feed conveyor 10. Such a pallet may contain 26 layers of glass jars to be unloaded or depalletized. Conveyor 10 is advanced under the control of the operator of the system and additional pallets can be placed several feet apart on this conveyor.

As the conveyor advances, the lead pallet enters elevator bin 14. Sometimes, a full pallet of jars may be slightly out of perpendicular and, to offset this problem, bin 14 may have side plates which straighten the stack as it enters bin 14. The full pallet, when completely in bin 14, engages front wall 16 and is halted thereby. As the pallet enters the bin, member 42 and the pusher bars are in their retracted positions. Also, plate 28 is in its retracted position shown in FIG. 8. Divider 26 will be on the top of the full stack. Thus, when mechanism 13 is energized, this top divider will engage sensor 34, causing the latter to stop the mechanism, whereupon the operator then actuates source 98 to effect the movement of member 42 and the pusher bars into bin 14. Member 42 moves the adjacent jars 25 to clear a portion of the upper surface of the divider of the first layer of jars. Simultaneously, the pusher bars move the last-mentioned divider against the inner face of front wall 16. Simultaneously with these actions, plate 28 is swept over the top divider and then returned to its retracted position. As plate 28 is retracted, member 42 and the pusher bars are also retracted. The top divider is then manually removed and placed on an accumulation conveyor (not shown) for movement away from the top of the bin.

The operator then actuates mechanism 13 to elevate the pallet until the top divider engages sensor 34. This causes the elevation to stop and the operator actuates source 98 to again effect inward movement of member 42 and pusher bars 70 for the same purpose as mentioned above. Simultaneously with these actions, plate 28 sweeps the uppermost layer of jars laterally and onto conveyor 20, there being a bridging or dead plate (not shown) between the upper stretch of the conveyor and the upper divider 26. The jars on the second layer are pushed inwardly by member 42 and the second divider is forced toward wall 16. As plate 28 is retracted, member 42 and the pusher bars are retracted also. The foregoing steps are repeated until the pallet is in the second layer position at which time the power devices 58 and 80 are overpowered by the pallet, signalling to the operator that the jars have all been removed from the pallet. Mechanism 13 is then lowered until it is at the bottom end of its path of travel. Conveyors 10 and 12 are then simultaneously actuated, the empty pallet moving onto discharge conveyor 32 and a full pallet moving onto conveyor 12 from conveyor 10. The foregoing process can be continued until all of the full pallets have been unloaded. Also, the collection of the empty pallets can be such that they are returned to a station from which they can be loaded onto the van and returned to the loading plant.

In the claims:

1. A method of unloading a plurality of articles arranged in layers on respective panel dividers disposed in a vertical stack comprising: elevating said stack; sensing an upper surface portion of the uppermost divider when the stack has been elevated through an incremental distance; stopping the elevation of the stack when the uppermost divider is sensed, sweeping the articles on the uppermost divider off the same when the elevation of the stack has been stopped; moving certain of the jars on a second divider to expose an upper surface portion thereof, and to permit the latter to be sensed when the stack is again moved through said incremental distance; and successively repeating said elevating, sensing, stopping, sweeping and moving steps until all of the articles have been swept off their respective dividers.

2. A method as set forth in claim 1, wherein said sweeping and moving steps occur simultaneously.

3. A method as set forth in claim 1, wherein is included the step of pushing the second divider along a horizontal path and through a distance to assure that it will be sensed when it becomes the uppermost divider.

* * * * *